(12) United States Patent
Takata et al.

(10) Patent No.: US 7,172,251 B2
(45) Date of Patent: Feb. 6, 2007

(54) FRAME STRUCTURE OF SEAT FOR VEHICLE

(75) Inventors: Yasuhide Takata, Hiroshima (JP); Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/501,909

(22) PCT Filed: Aug. 20, 2003

(86) PCT No.: PCT/JP03/10489

§ 371 (c)(1),
(2), (4) Date: Jul. 20, 2004

(87) PCT Pub. No.: WO2004/018255

PCT Pub. Date: Mar. 4, 2004

(65) Prior Publication Data
US 2005/0006937 A1    Jan. 13, 2005

(30) Foreign Application Priority Data
Aug. 21, 2002  (JP) .............................. 2002-240605

(51) Int. Cl.
*F16M 13/00* (2006.01)
*A47C 1/02* (2006.01)

(52) U.S. Cl. ........................ 297/344.15; 297/344.13; 248/421

(58) Field of Classification Search ........... 297/344.15, 297/344.13; 248/157, 421
See application file for complete search history.

(56) References Cited

U.S. PATENT DOCUMENTS

| | | | |
|---|---|---|---|
| 4,729,539 A * | 3/1988 | Nagata ........................ 248/575 |
| 5,116,016 A | 5/1992 | Nagata |
| 5,294,085 A | 3/1994 | Lloyd et al. |
| 5,927,679 A * | 7/1999 | Hill ............................ 248/588 |
| 6,084,329 A * | 7/2000 | Fujita et al. ................ 310/90.5 |
| 6,336,627 B1 * | 1/2002 | Fujita et al. ................ 267/131 |
| 6,354,556 B1 * | 3/2002 | Ritchie et al. .............. 248/562 |
| 6,357,729 B1 * | 3/2002 | Takata ........................ 267/131 |
| 6,361,109 B1 * | 3/2002 | Tokarz et al. .......... 297/344.15 |
| 6,364,294 B1 | 4/2002 | Gennesseaux et al. |
| 6,366,190 B1 * | 4/2002 | Fujita et al. ................ 335/285 |
| 6,425,557 B1 * | 7/2002 | Becker et al. .............. 248/157 |
| 6,585,240 B1 * | 7/2003 | Fujita et al. ................ 267/136 |
| 2004/0090100 A1 * | 5/2004 | Igarashi .................. 297/344.15 |

FOREIGN PATENT DOCUMENTS

| | | |
|---|---|---|
| EP | 0 331 898 | 9/1989 |
| GB | 2041062 A * | 9/1980 |
| JP | 63-8133 | 1/1988 |
| JP | 3-15223 | 2/1991 |
| JP | 6-50374 | 2/1994 |
| JP | 7-24638 | 5/1995 |

* cited by examiner

*Primary Examiner*—Peter M. Cuomo
*Assistant Examiner*—Sara B. McPartlin
(74) *Attorney, Agent, or Firm*—Wenderoth, Lind & Ponack, L.L.P.

(57) ABSTRACT

A lifter for adjusting the height of a frame 10, 12, 14 that is to be vertically movably mounted on a vehicle floor is integrally formed with a suspension unit S for absorbing vibration inputted to the frame 10, 12, 14. The suspension unit S includes a magnet unit or a magnetic fluid damper.

9 Claims, 12 Drawing Sheets

FRAME STRUCTURE OF SEAT FOR VEHICLE

TECHNICAL FIELD

The present invention relates to a frame structure on which an automobile seat is mounted and, more particularly, to a compact frame structure for an automobile seat that is superior in vibration characteristics and can isolate low-frequency signals.

BACKGROUND ART

It is a general practice that a lifter for adjusting the height of a seat and a suspension unit for absorbing vibration inputted to the seat are constructed separately. In applications where these two structures are incorporated into a single unit, the unit increases in weight, cost and layout. Accordingly, a suspension unit in which a lifter has been incorporated is difficult to be mounted on a low hip-point car such as, for example, a passenger car.

Furthermore, in order to process and analyze biological signals, processing of noises less than 10 Hz is indispensable and, hence, the vibration characteristics less than 10 Hz must be improved.

The present invention has been developed to overcome the above-described disadvantages, and an objective of the present invention is to provide a compact frame structure for an automobile seat which can be installed in a low hip-point car such as, for example, a passenger car and in which a lifter is integrally formed with a suspension unit. This frame structure can improve vibration or impact absorptivity and vibration characteristics less than 10 Hz and can pursue safety and comfort as a whole using Chaos characteristic analysis or the like.

DISCLOSURE OF THE INVENTION

In accomplishing the above objective, the frame structure for the automobile seat according to the present invention includes a frame to be vertically movably mounted on a vehicle floor, a lifter for adjusting a height of the frame, and a suspension unit for absorbing vibration inputted to the frame, wherein the lifter is integrally formed with the suspension unit.

The frame structure further includes a torsion bar to be rotatably mounted on the vehicle floor, a first link mechanism through which the torsion bar is connected to the frame, and an operating means connected to the first link mechanism, wherein height adjustments of a front end portion of the frame are carried out via the first link mechanism and height adjustments of a rear end portion of the frame are carried out via the second link mechanism by operating the operating means.

The suspension unit includes a magnet unit having a movable magnet and stationary magnets or a magnetic fluid damper.

DETAILED DESCRIPTION OF THE PREFERRED EMBODIMENTS

Preferred embodiments of the present invention are explained hereinafter with reference to the drawings.

FIGS. 1 to 4 depict a frame structure F for an automobile seat according to the present invention, in which a lifter and a suspension unit are both incorporated.

A lifter structure L is first discussed with reference to FIGS. 5 to 11. The lifter structure L is mounted on a pair of seat slider units 2 spaced apart from each other in the widthwise direction of a vehicle. Each of the seat slider units 2 includes a lower slider 4 to be secured to a vehicle floor and an upper slider 6 slidably mounted on the lower slider 4. The lifter structure L according to the present invention is mounted on the upper sliders 6.

Figure 9:
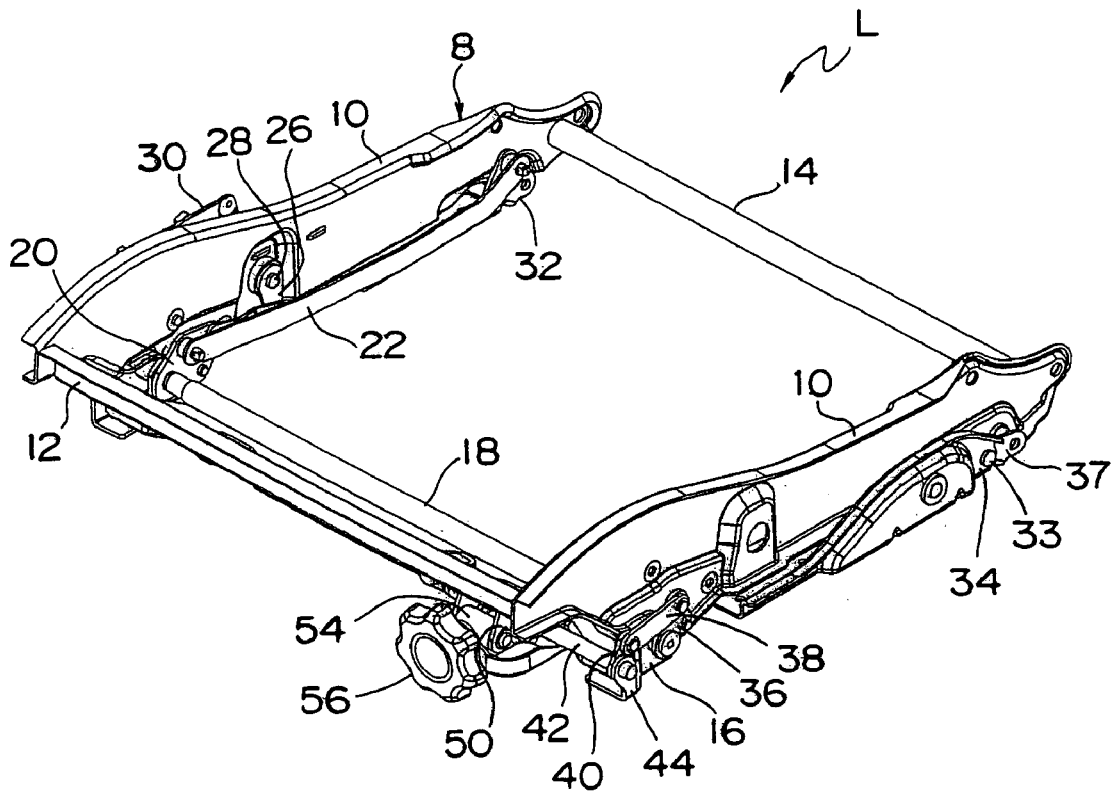
FIG. 9 is a perspective view of the lifter structure with the frame located at a lowermost position thereof.
Figure 10:
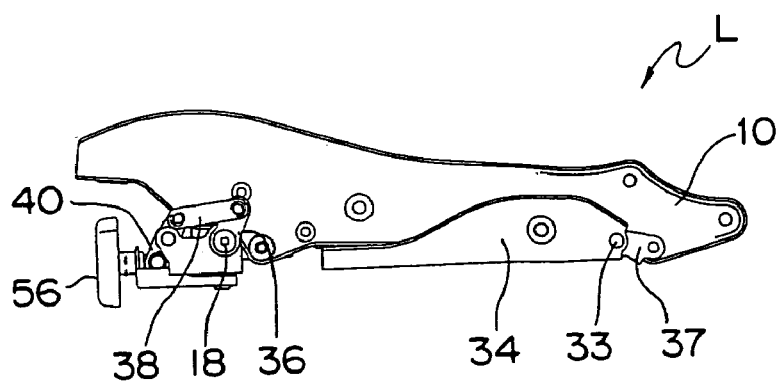
FIG. 10 is a side view of the lifter structure of FIG. 9.
Figure 11:
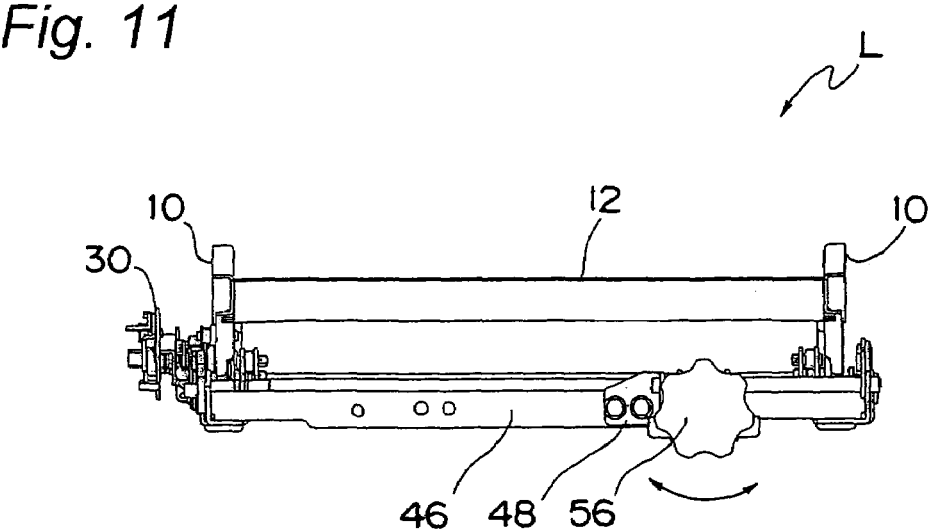
FIG. 11 is a front view of the lifter structure of FIG. 9.
Figure 12:
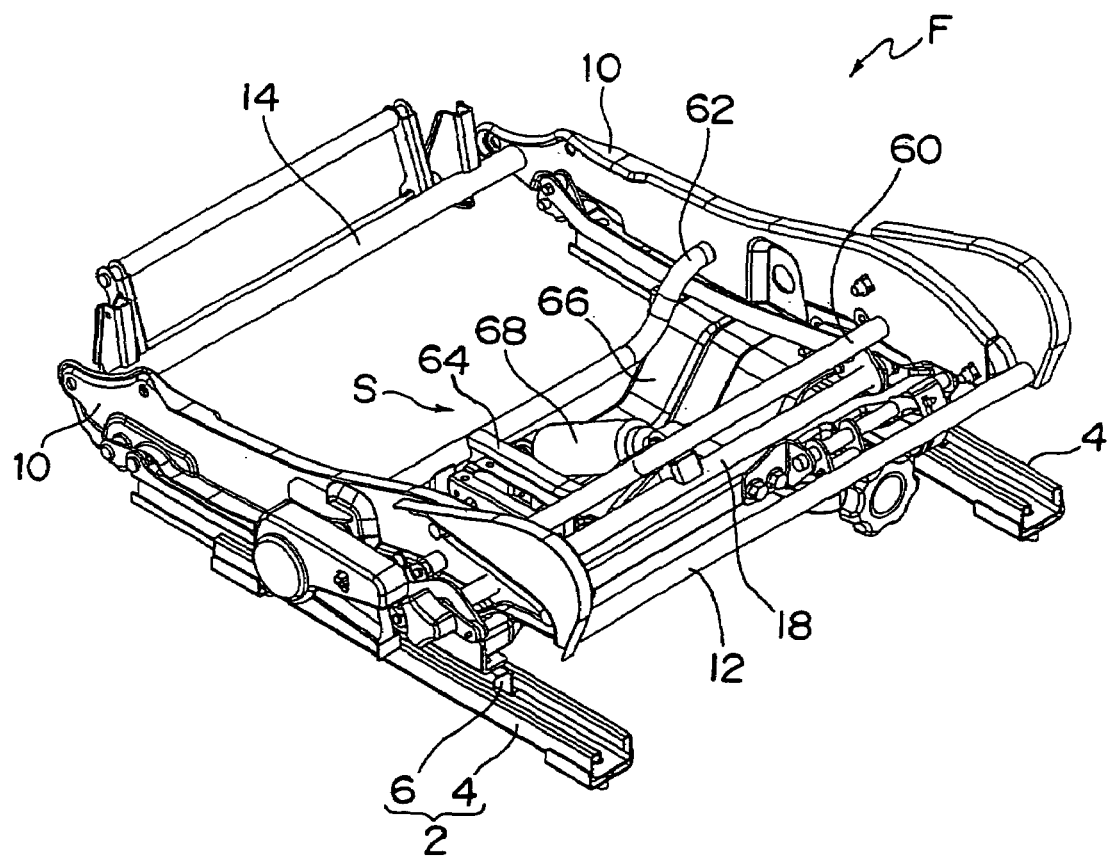
FIG. 12 is a perspective view of the lifter structure with the frame located at the lowermost position thereof.
Figure 13:
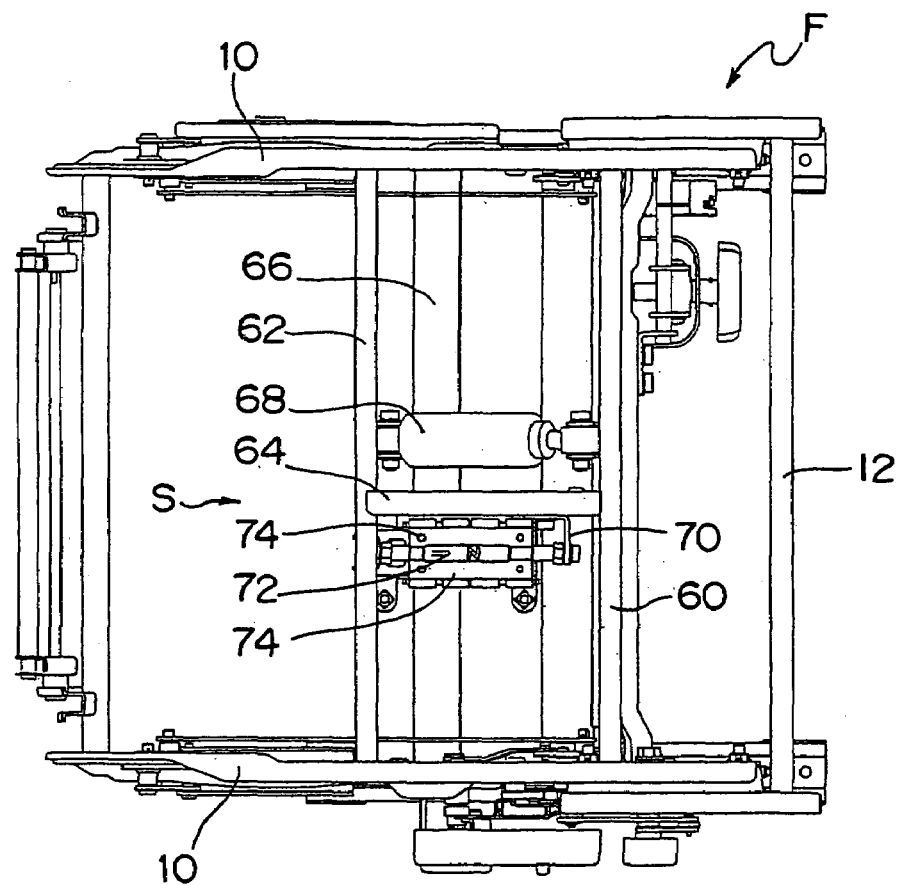
FIG. 13 is a top plan view of the lifter structure of FIG. 12.
Figure 14:
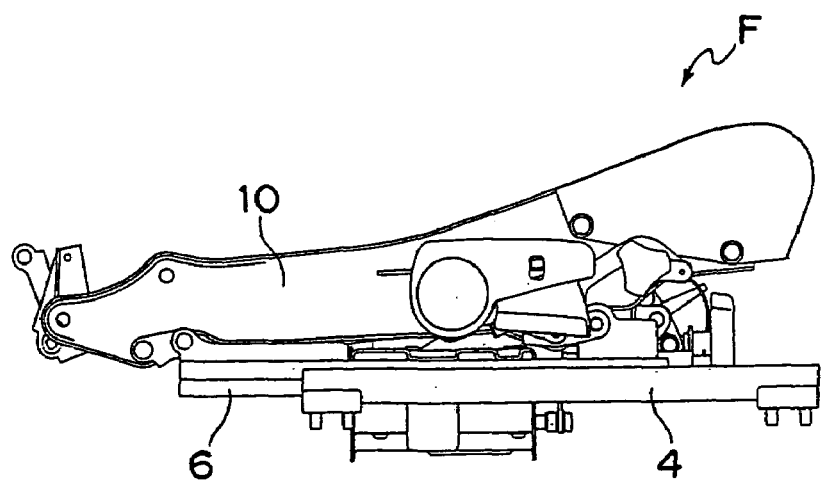
FIG. 14 is a side view of the lifter structure of FIG. 12.
Figure 15:
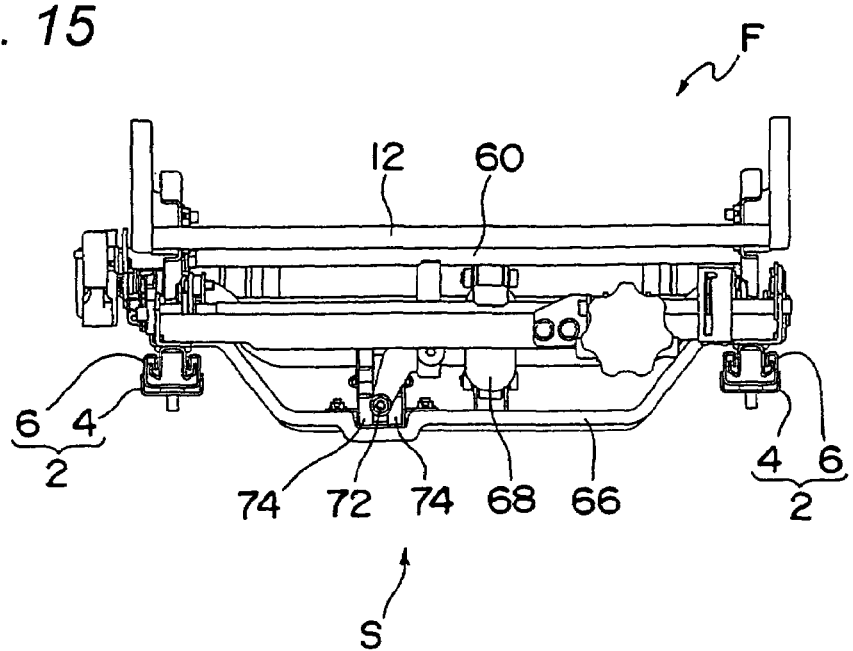
FIG. 15 is a front view of the lifter structure of FIG. 12.

The lifter structure L includes a frame 8 of a generally rectangular shape as viewed from above, which includes a pair of side frames 10, a front frame 12 joined at opposite ends thereof to front ends of the side frames 10, and a rear frame 14 joined at opposite ends thereof to rear ends of the side frames 10. FIGS. 1 to 4 or FIGS. 5 to 8 depict the frame structure F or the lifter structure L with the frame 8 located at an uppermost position thereof, respectively, while FIGS. 9 to 11 depict the lifter structure L with the frame located at a lowermost position thereof.

A bracket 16 bent in the form of a figure "L" is joined to each of the upper sliders 6, and opposite ends of a torsion bar 18 are rotatably connected to both the brackets 16. A generally rhombic front lifter link 20 is secured at one end thereof in the direction of the major axis to the torsion bar 18 at a location inwards of the bracket 16, and a front end of a connecting link 22 that connects the front lifter link 20 and a rear lifter link (explained later) to each other is pivotally connected to one end of the lifter link 20 in the direction of the minor axis thereof. The other end of the lifter link 20 in the direction of the minor axis thereof is pivotally connected to the side frame 10.

Furthermore, one end of a first lever 24 is pivotally connected to the other end of one (right-hand side) of the front lifter links 20 in the direction of the major axis thereof, and the other end of the first lever 24 is pivotally connected to one end of a second lever 26. The other end of the second lever 26 is secured to an inner end of a connecting shaft 28 that is rotatably mounted on one (right-hand side) of the side frames 10. One end of a lifter lever 30 is secured to an outer end of the connecting shaft 28.

A rear end of the connecting link 22 is pivotally connected to one end of a generally triangular rear lifter link 32, and another end of the rear lifter link 32 is pivotally connected via a pin 33 to a bracket 34 joined to the upper slider 6. A further end of the rear lifter link 32 is pivotally connected to the side frame 10 via a pin 35. Opposite ends of a link 37 positioned externally of the side frame 10 are pivotally connected to the pin 33 and the pin 35, respectively.

One end of a first link 36 is secured to one end (left end) of the torsion bar 18, and the other end of the first link 36 is pivotally connected to one end of a second link 38. The other end of the second link 38 is pivotally connected to one end of a third link 40, and the other end of the third link 40 is secured to one end of a rotary shaft 42, which is also rotatably mounted on a generally L-shaped bracket 44 joined to the upper slider 6. The other end of the rotary shaft 42 is rotatably mounted on a generally L-shaped bracket 48 that is threaded to a connecting member 46 joined at opposite ends thereof to the pair of upper sliders 6.

A pair of parallel links 50 are secured at one end thereof to the rotary shaft 42, and opposite ends of an adjusting nut 54 held in mesh with an adjusting screw 52 are pivotally connected to the other ends of the parallel links 50, respectively. The adjusting screw 52 has an adjusting knob 56 mounted on a front end thereof, and a rear end of the adjusting screw 52 is rotatably mounted on the connecting member 46.

The operation of the lifter structure L of the above-described construction is explained hereinafter.

In an attempt to carry out weight adjustments after a user has sat on a seat (not shown) mounted on the lifter structure L, when the adjusting knob 56 positioned below a front end portion of the seat is rotated, the adjusting screw 52 rotates together with the adjusting knob 56. As a result, the adjusting nut 54 held in mesh with the adjusting screw 52 moves in the direction longitudinally of the vehicle. The longitudinal movement of the adjusting nut 54 rotates, via the parallel links 50, the rotary shaft 42, which in turn twists the torsion bar 18 via the third, second and first links 40, 38, 36. A lifting force of the frame 8 is thus produced depending on the amount of twist of the torsion bar 18, and the weight adjustments are carried out by such a lifting force.

The operating force of the lifter structure L that varies depending on the weight difference is discussed taking the case where a light person sits on the seat.

Where the person who has sat on the seat is light, the frame 8 is located at a position close to the uppermost position shown in FIGS. 5 to 8 and, hence, the amount of twist of the torsion bar 18 is small. Accordingly, the lifting force of the frame 8 is relatively small, and a large operating force is required to press the frame 8 down towards the lowermost position.

When a front end portion of the lifter lever 30 is depressed a predetermined amount, the connecting shaft 28 rotates in the direction of an arrow A, and the front lifter link 20 located on the right-hand side rotates in the direction of an arrow B via the second and first levers 26, 24. Rotation of the front lifter link 20 on the right-hand side is transmitted to the front lifter link 20 located on the left-hand side via the torsion bar 18, and the pair of front lifter links 20 rotate in the same direction.

As a result, the front ends of both the connecting links 22 move up, while the ends of the front lifter links 20 on the minor axis remote from the front ends of the connecting links 22 move down, and the frond end portions of the side frames 10 connected to such ends of the front lifter links 20 move down a predetermined amount. At this moment, the torsion bar 18 twists to increase the lifting force of the frame 8 depending on the amount of downward movement of the side frames 10, thus balancing the operating force required to depress the frame 8 towards the lowermost position and the operating force required to push the frame 8 up towards the uppermost position.

With the upward movement of the front ends of the connecting links 22, they also move rearwards, followed by a rearward movement of the rear ends of the connecting links 22, which in turn causes rotation of the rear lifter links 32 in the direction of an arrow C. As a result, the rear ends of the side frames 10 to which the pins 35 are connected move down, and the frame 8 moves down a predetermined amount as a whole and is held at an intermediate position between the uppermost position shown in FIGS. 5 to 8 and the lowermost position shown in FIGS. 9 to 11.

In contrast, where the person who has sat on the seat is heavy, the frame 8 is located at a position close to the lowermost position shown in FIGS. 9 to 11 and, hence, the amount of twist of the torsion bar 18 is large. Accordingly, the lifting force of the frame 8 is relatively large, and a large operating force is required to push the frame 8 up towards the uppermost position.

In this case, when the front end portion of the lifter lever 30 is pushed up a predetermined amount, the associated members operate in the manner opposite to the above, and the frame 8 moves up a predetermined amount as a whole and is held at an intermediate position between the uppermost position and the lowermost position.

In the embodiment explained hereinabove, the adjusting screw 52 and the adjusting nut 54 held in mesh with each other are operated by appropriately rotating the adjusting knob 56 so that one end of the torsion bar 18 may be twisted via a link mechanism such as the parallel links 50, the rotary shaft 42 and the like. The weight adjustments are carried out by adjusting the amount of twist of the torsion bar 18. Furthermore, the other end of the torsion bar 18 is twisted via a link mechanism such as the connecting shaft 28, the plurality of levers 24, 26 and the like by appropriately rotating the lifter lever 30, while the spring force of the torsion bar 18 is changed and height adjustments of the frame 8 are carried out at the same time by transmitting the operating force of the lifter lever 30 to the frame 8 via a link mechanism such as the front lifter links 20, the connecting links 22 and the like, thus absorbing individual differences of seat occupants.

It is to be noted here that although in the above-described embodiment the brackets and the like required to hold the frame 8 are mounted to the upper sliders 6 of the seat slider units 2, they may be mounted directly to the vehicle floor.

The suspension unit S that is mounted on the lifter structure F discussed above includes a damper and a magnet unit. This suspension unit S is explained hereinafter with reference to FIGS. 1 to 4.

As discussed hereinabove, the front end portions of the pair of side frames 10 are connected to each other by the front frame 12, and the rear end portions of the pair of side frames 10 are connected to each other by the rear frame 14. First and second medial frames 60, 62 disposed between the front frame 12 and the rear frame 14 are similarly connected at opposite ends thereof to intermediate portions of the pair of side frames 10. Furthermore, intermediate portions of the first and second medial frames 60, 62 are connected to each other by a connecting member 64. In addition, a support plate 66 that is joined at opposite ends thereof to the upper sliders 6 is disposed below the first and second medial frames 60, 62.

A lower end of a damper 68 is pivotally connected to a rear portion of the support plate 66, and an upper end of the damper 68 is pivotally connected to the torsion bar 18. One end of a movable magnet 72 is held by the connecting member 64 via a bracket 70, and the other end of the movable magnet 72 is held by the second medial frame 62. The movable magnet 72 is vertically movably disposed within a space defined between a pair of stationary magnets 74 that are held by the support plate 66 so as to confront each other. The magnet unit described above is made up of the movable magnet 72 and the stationary magnets 74, which are substantially the same in construction as a sliding portion (movable magnet) 100 and stationary magnets 86 both provided in a magnetic fluid damper that will be explained later.

A cushioning member 78 for relieving a top-end shock is mounted on about the center of the first medial frame 60 via a bracket 76, while a cushioning member 80 for relieving a bottom-end shock is mounted on a rear portion of each upper slider 6. An elastic material such as, for example, rubber is used for the cushioning member 78 or the cushioning member 80.

When vibration is inputted from outside to the suspension unit S of the above-described construction, the frame 8 moves up and down with respect to the upper sliders 6. At this moment, the elastic force of the magnet unit 72, 74 and the elastic force of the torsion bar 18 vary depending on the distance between the frame 8 and the upper sliders 6, thereby absorbing the vibration.

Furthermore, when an impact force that exceeds the elastic force of the magnet unit 72, 74 and the elastic force of the torsion bar 18 is inputted, the damper 68 or the cushioning members 78, 80 act to absorb the impact force.

As described hereinabove, FIGS. 1 to 4 depict the frame structure F with the frame 8 located at the uppermost position thereof, while FIGS. 12 to 15 depict the frame structure F with the frame 8 located at the lowermost position thereof.

Figure 16:
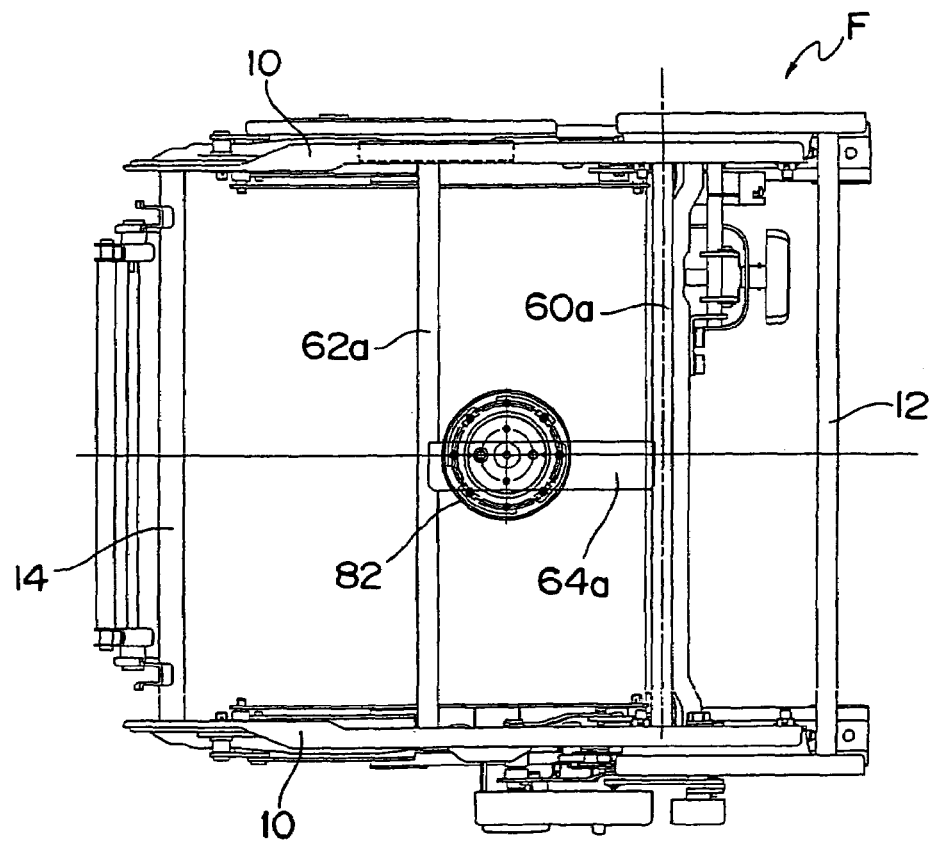
FIG. 16 is a top plan view of the frame structure for the automobile seat according to the present invention in which a suspension unit having a magnetic fluid damper has been incorporated.
Figure 17:
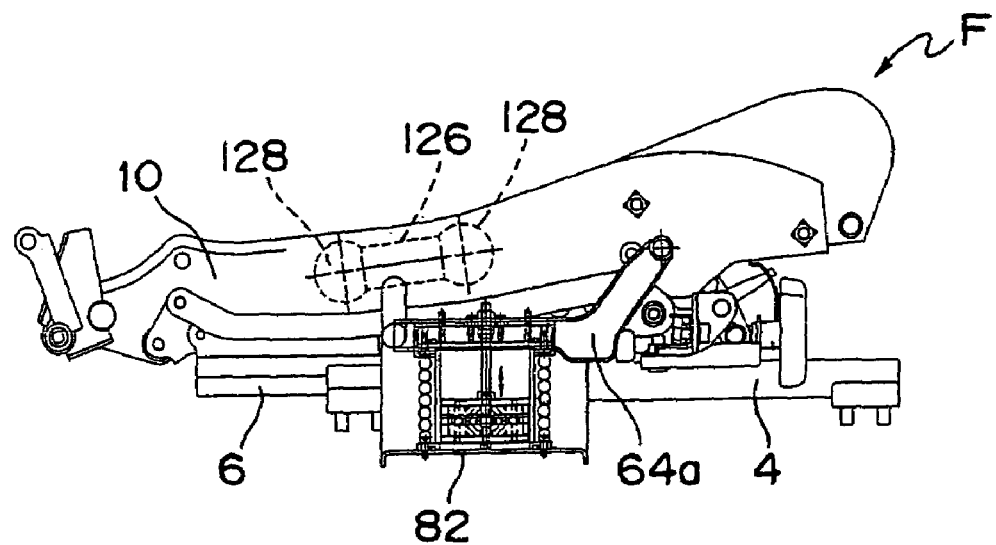
FIG. 17 is a side view of the frame structure of FIG. 16.
Figure 18:
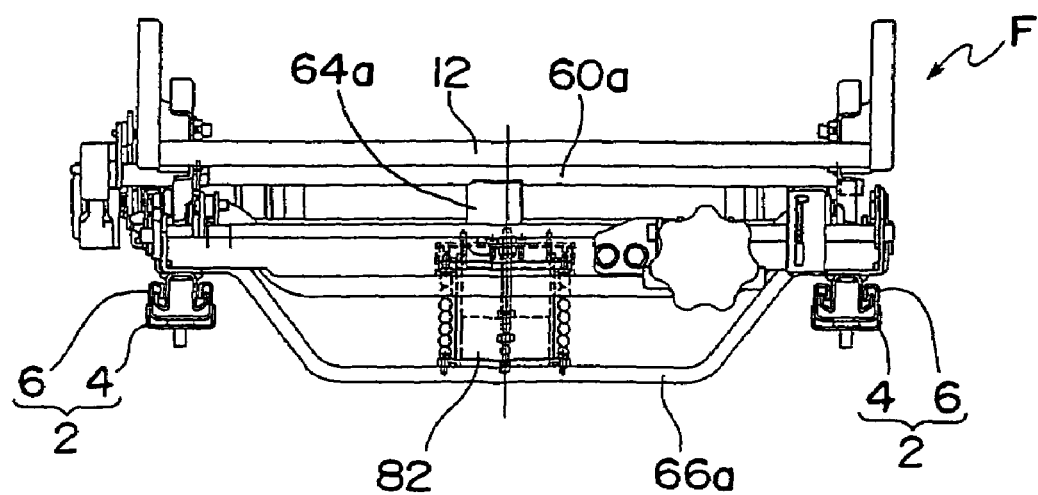
FIG. 18 is a front view of the frame structure of FIG. 16.

In place of the damper 68 and the magnet unit 72, 74, a magnetic fluid damper 82 may be incorporated in the suspension unit, as shown in FIGS. 16 to 18. The magnetic fluid damper 82 is a shock absorber that can vary a damping force by changing the behavior of magnetic particles in a magnetic fluid by utilization of permanent magnets.

Figure 19:
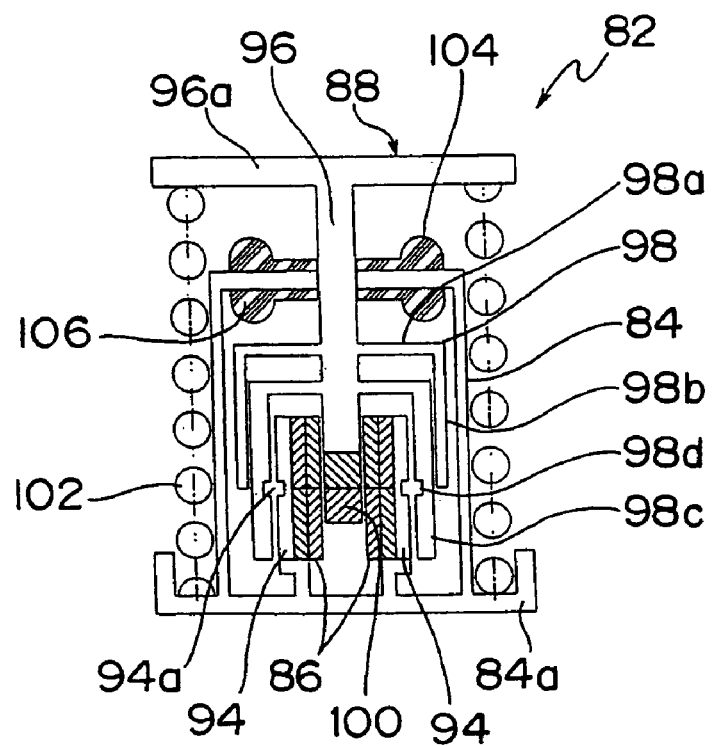
FIG. 19 is a vertical sectional view of the magnetic fluid damper.

More specifically, as shown in FIG. 19, the magnetic fluid damper 82 includes a casing 84 that is a stationary portion, a pair of stationary magnets 86 fixedly mounted on the casing 84 and spaced away from each other a predetermined distance, and a movable portion 88 mounted on the casing 84 so as to be slidable relative thereto.

A magnetic fluid, in which magnetic particles are dispersed in a base fluid using a surface active agent, is sealingly filled in a space within the casing 84. The magnetic particles orient in arbitrary directions in the absence of a magnetic field, but magnetic moments orient and cohere in the magnetic field to thereby form or grow clusters. Accordingly, shearing stresses in the direction perpendicular to the magnetic field become large, and the viscosity of the magnetic fluid increases. Water, a fluorine oil, a hydrocarbon oil or the like is used as the base fluid, while ferrite particles, magnetite particles or the like are used as the magnetic particles.

A yoke 94 made of a ferromagnet such as iron is joined to each stationary magnet 86 mounted on the casing 84 and has a groove 94a of a predetermined width that is formed in an outer surface of the yoke 94 at an intermediate portion in the axial direction thereof so as to extend in the direction perpendicular to the axial direction thereof. The groove 94a acts to produce a leakage flux, enhancing the density of the lines of magnetic force.

The movable portion 88 includes a piston 98 inserted in the casing 84 via a piston rod 96 having a head portion 96a. The piston 98 includes a flange portion 98a extending outwards from the piston rod 96, an outer cylindrical portion 98b extending parallel to a side wall of the casing 84, and an inner cylindrical portion 98c formed inside the outer cylindrical portion 98b. The inner cylindrical portion 98c has a groove 98d of a predetermined width that is formed in an inner surface thereof at an intermediate portion in the axial direction thereof so as to extend in the direction perpendicular to the axial direction thereof. A sliding portion 100 made up of permanent magnets is provided at a distal end of the piston rod 96, and the permanent magnets constituting the sliding portion 100 are polarized, for example, in the axial direction thereof and positioned inside the stationary magnets 86. That is, the sliding portion 100 slides in the axial direction inside the stationary magnets 86 so that a repulsive force or an attractive force produced between the movable magnets constituting the sliding portion 100 and the stationary magnets may create a predetermined spring force, which in turn acts as a damping force.

One end of a coil spring 102 is held in abutment with a head portion 96a in the form of a flange formed with the piston rod 96, while the other end of the coil spring 102 is held in abutment with a spring receiver 84a in the form of a flange formed at a lower end of the casing 84, thus biasing the head portion 96a of the piston rod 96 in the direction away from the casing 84. The head portion 96a is held by a connecting member 64a that connects a first medial frame 60a and a second medial frame 62a to each other, while the casing 84 is held by a support plate 66a.

The casing 84 has cushioning members 104, 106 made of, for example, rubber and formed on outer and inner surfaces of an upper wall thereof, respectively. When the movable portion 88 is displaced largely, for example, by a large vibration or the like, the head portion 96a or the piston 98 impinges on the cushioning member 104 or 106, thereby relieving the bottom-end shock or the top-end shock, respectively.

When the vehicle body vibrates due to vibration inputted thereto, the movable portion 88 undergoes a reciprocating motion relative to the casing 84. As a result, the vibration is attenuated by the spring characteristics of the coil spring 102, and a predetermined spring force is created by a repulsive force or an attractive force between the sliding portion 100 and the stationary magnets 86 so that structural damping caused by the reciprocating motion may create a damping force.

When the coil spring 102 contracts, the magnetic fluid in a chamber encircled by the flange portion 98a and the outer cylindrical portion 98b is compressed, while when the coil spring 102 expands, the magnetic fluid in a chamber separated from the above chamber by the flange portion 98a and the outer cylindrical portion 98b is compressed. Because of this, the magnetic fluid moves between the two chambers through a fluid passage defined between the yoke 94 and the inner cylindrical portion 98c of the piston 98, and a predetermined damping force is created by a resistance produced when the magnetic fluid passes through the fluid passage that functions as an orifice.

Figures 20A, 20B:
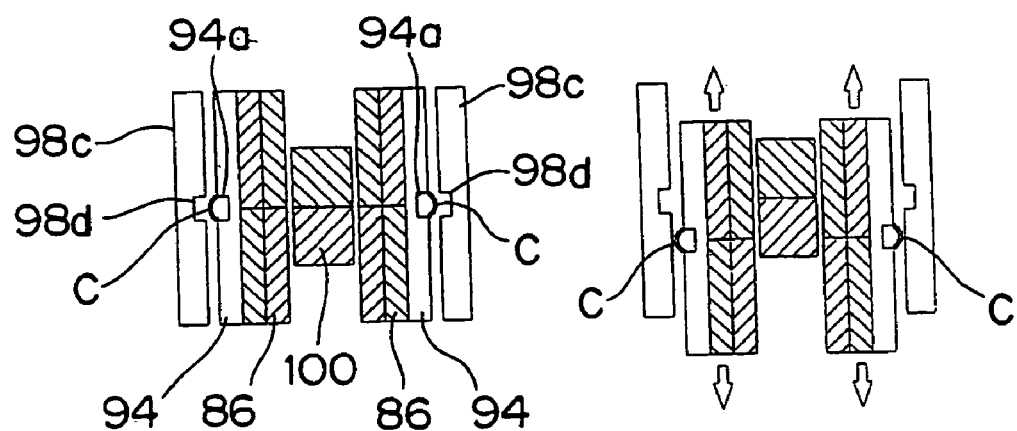
FIG. 20A is a sectional view indicating a working principle of the magnetic fluid damper, particularly depicting the case where the resistance produced when a magnetic fluid flows through a fluid passage forming an orifice is small.
FIG. 20B is a sectional view indicating the working principle of the magnetic fluid damper, particularly depicting the case where the resistance produced when the magnetic fluid flows through the fluid passage forming the orifice is large.

As shown in FIGS. 20A and 20B, the magnetic particles contained in the magnetic fluid cohere to form a large cluster C around the groove 94a, which is formed in the outer surface of the yoke 94 and forms a strong leakage flux generating portion. Because the cluster C thus formed becomes a resistance of flow for the magnetic fluid flowing through the fluid passage, the resistance produced when the magnetic fluid passes through the fluid passage varies depending on a relative positional relationship between the groove 94a in the outer surface of the yoke 94 and the groove 98d in the inner surface of the inner cylindrical portion 98c of the piston 98. That is, in the condition as shown in FIG. 20A, the resistance produced when the magnetic fluid flows through the fluid passage forming the orifice is small and the damping force is also small, while in the condition as shown in FIG. 20B, there is greater resistance to passing of the magnetic fluid through the fluid passage, thus increasing the damping force.

The frame structure F according to the present invention includes a locking device M for locking the lifter. The locking device M is explained hereinafter with reference to FIGS. 21A and 21B and FIGS. 22A and 22B.

As shown in these figures, the locking device M includes a lock receiver 110 mounted on one end of the torsion bar 18 and a locking member 112 that engages with or disengages from the lock receiver 110.

The locking member 112 is pivotally mounted on one (right-hand side) of the pair of side frames 10 and has a pin 114 implanted in one end (free end) of the locking member 112. An operating member 116 made up of a pair of generally flat members extending parallel to each other is pivotally mounted on the lock receiver 110. One of the generally flat members of the operating member 116 has an elongated opening 116a defined therein, in which the pin 114 implanted in the locking member 112 is loosely inserted. The other of the generally flat members of the operating member 116 has a pin mounting tab 116b unitarily formed therewith. A pin 118 implanted in the pin mounting tab 116b is loosely inserted in an elongated opening 120a defined in one end of a first operating lever 120 that is bent in the form of a figure "V". The other end of the first operating lever 120 is pivotally connected to one end of a second operating lever 122, and an operating knob 124 is mounted on the other end of the second operating lever 122.

Figure 21A:
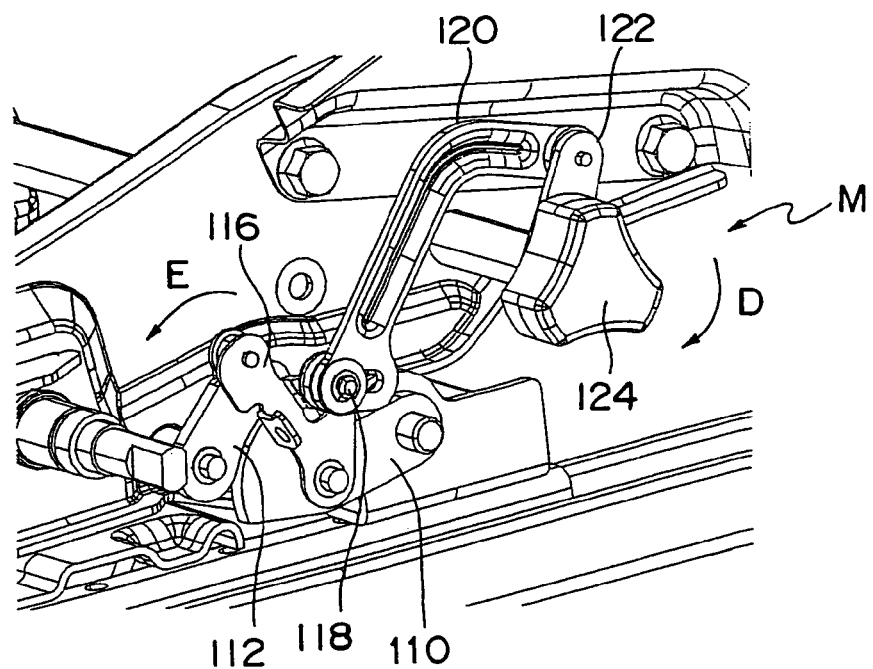
FIG. 21A is a perspective view of a lifter locking device when the lifter is locked.
Figure 21B:
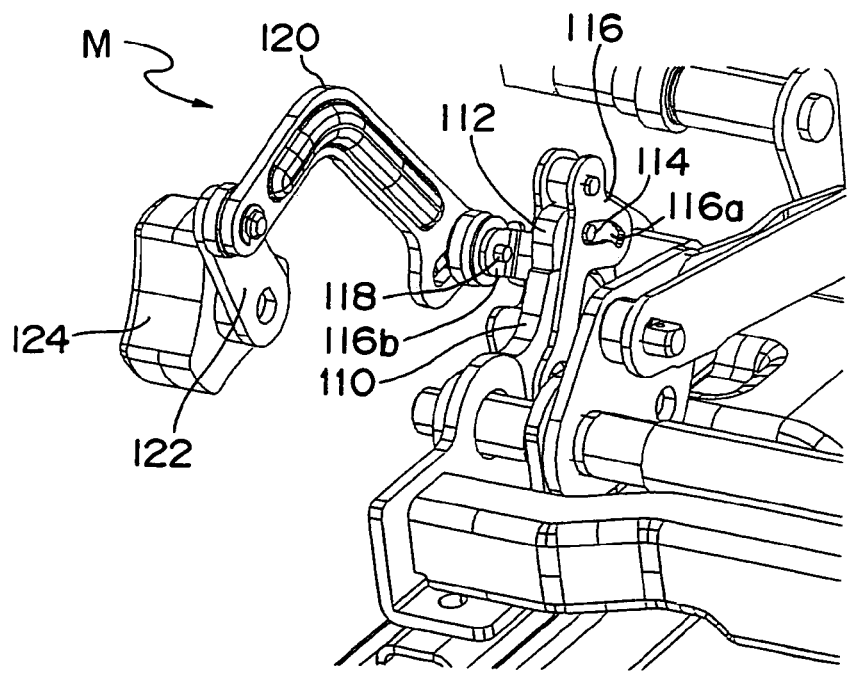
FIG. 21B is another perspective view of the lifter locking device when the lifter is locked.
Figure 22A:
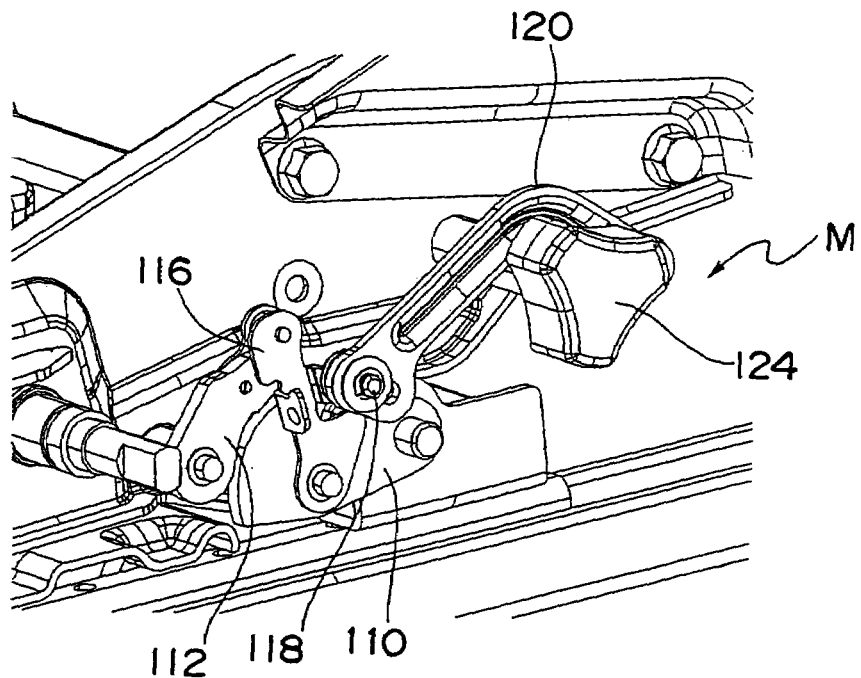
FIG. 22A is a perspective view of the lifter locking device when locking of the lifter is released.
Figure 22B:
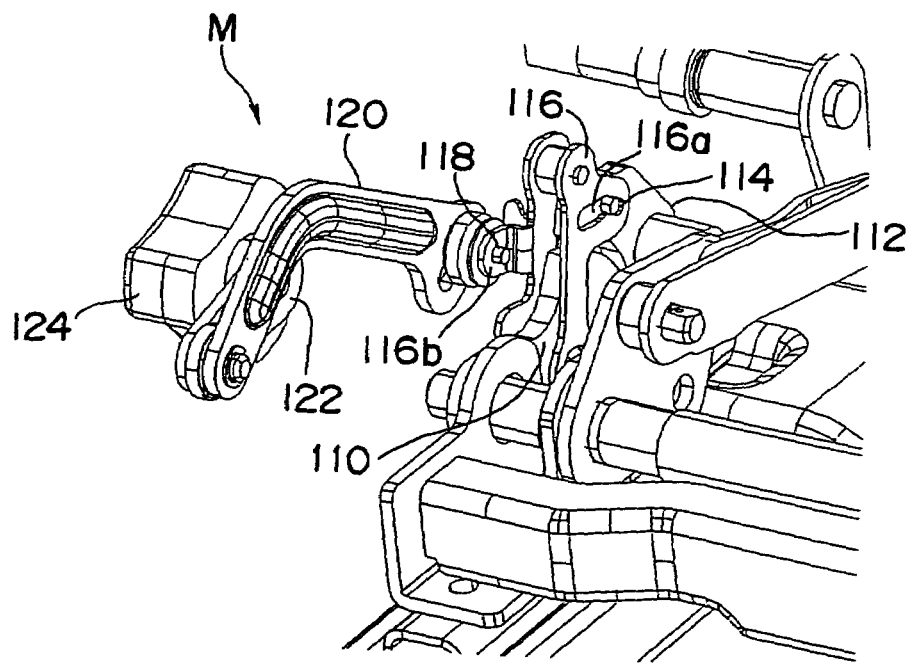
FIG. 22B is another perspective view of the lifter locking device when locking of the lifter is released.

FIGS. 21A and 21B depict a locking condition in which the frame 8 is located at the lowermost position and the locking member 112 is held in engagement with the lock receiver 110. In this condition, the torsion bar 18 is locked by the locking member 112 via the lock receiver 110, preventing rotation of the front lifter link 20. Accordingly, the frame 8 is held in this condition and the suspension unit S does not work.

In this condition, when the operating knob 124 is rotated in the direction of an arrow D in FIG. 21A, the operating member 116 pivots forwards via the first and second operating levers 120, 122. Because the elongated opening 116a defined in the operating member 116 is formed such that the distance from the center of pivoting motion of the operating member 116 increases rearwards, the forward movement of the operating member 116 causes the locking member 112 to pivot in the direction of an arrow E. As a result, the distal end (free end) of the locking member 112 moves up, and locking of the lock receiver 110 by the locking member 112 is released and, hence, the suspension unit S works as an original suspension unit.

The suspension unit S mounted on the frame structure F can isolate low-frequency signals (noises) less than about 10 Hz and can be used for an automobile intelligent seat.

More specifically, a system for recognizing and awakening seat occupants is required not to fail to collect only biological signals, and when the biological signals (breathing, heartbeat, pulse wave and the like) required for analysis are collected by a seat sensor, the most serious hindrance is noises mixed in the biological signals.

Of the biological signals, the respiration rate and the heart rate are generally 15–20 times/min and 50–70 times/min, which correspond to 0.25–0.33 Hz and 0.83–1.17 Hz in frequency, respectively. The frequency band required to analyze the pulse wave is in the range of 0.5–10 Hz. On the other hand, the noises include those caused by vibration of the vehicle and those caused by vibration of wiring (cables) that connects the sensor portion and a measuring device. Because a low-pass filter can be used to cope with noises greater than 10 Hz, only the biological signals can be positively collected upon separation of noises by improving the vibration characteristics in the frequency band less than 10 Hz.

As indicated by a dotted line in FIGS. 16 and 17, an awakening system can be constructed by mounting on the frame 8 an actuator 126 and an oscillator 128 that is operated by the actuator 126. That is, upon positive collection of only the biological signals, whether the driver is dozing is distinguished based on information obtained from the biological signals, and if the driver shows a sign of dozing while driving, the oscillator 128 can be operated by the actuator 126 to awaken the driver.

Figure 1:
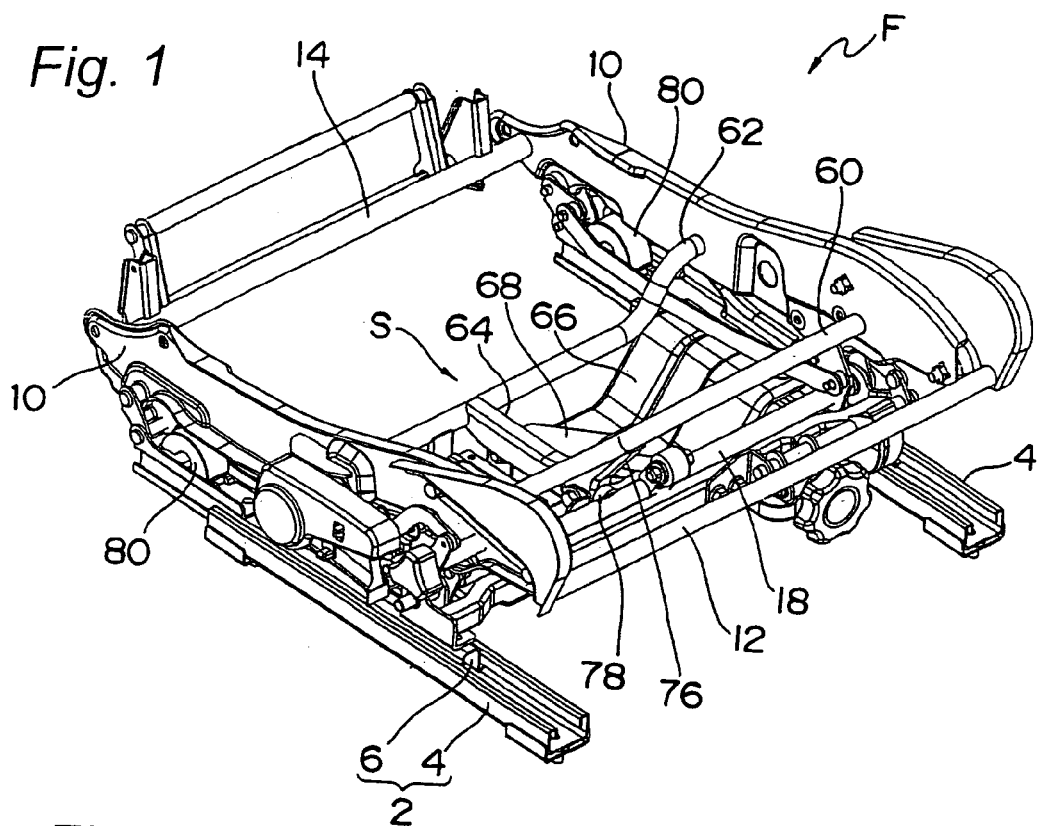
FIG. 1 is a perspective view of a frame structure for an automobile seat according to the present invention with a frame located at an uppermost position thereof.
Figure 2:
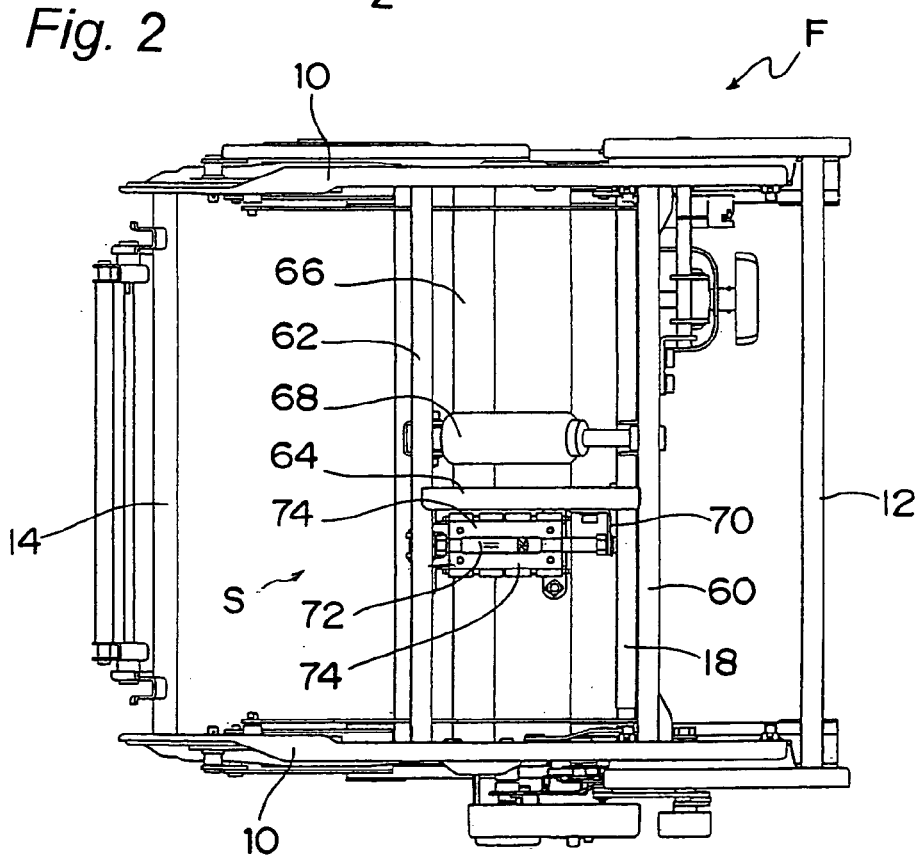
FIG. 2 is a top plan view of the frame structure of FIG. 1.
Figure 3:
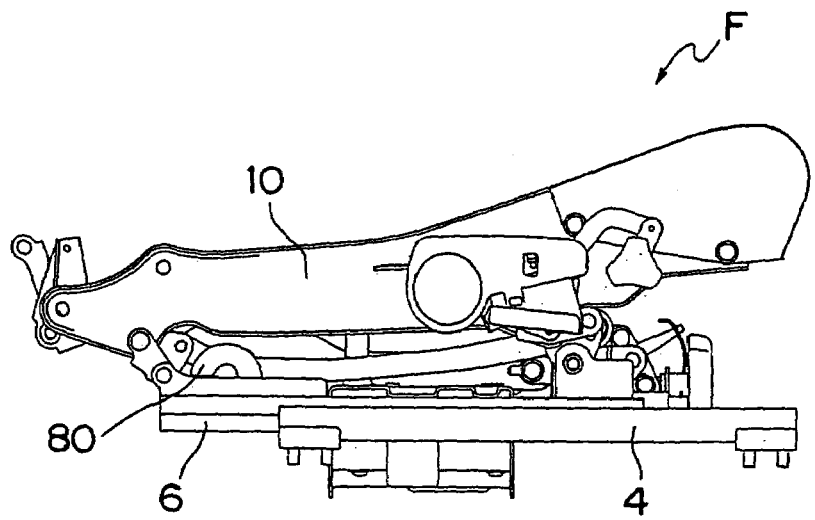
FIG. 3 is a side view of the frame structure of FIG. 1.
Figure 4:
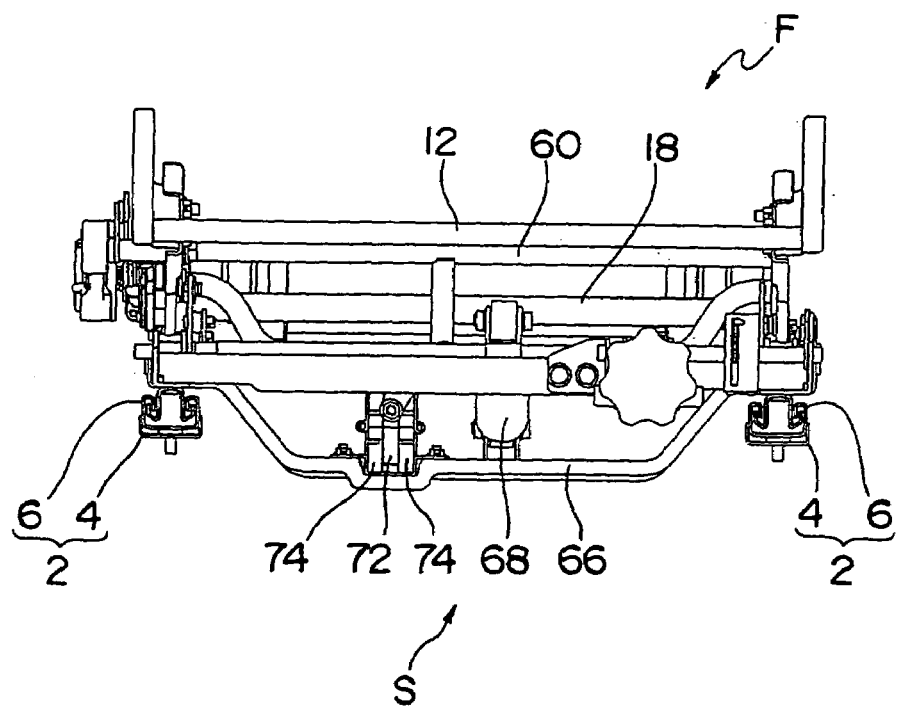
FIG. 4 is a front view of the frame structure of FIG. 1.
Figure 5:
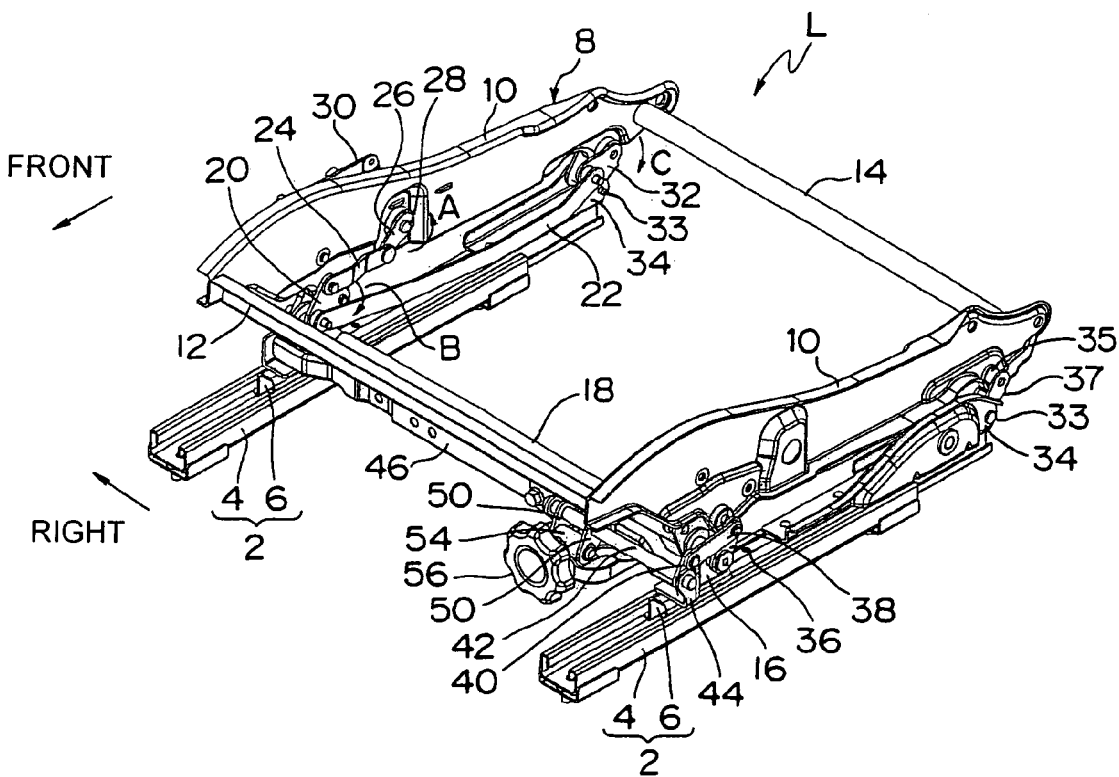
FIG. 5 is a perspective view of a lifter structure provided in the frame structure of FIG. 1 with the frame located at the uppermost position thereof.
Figure 6:
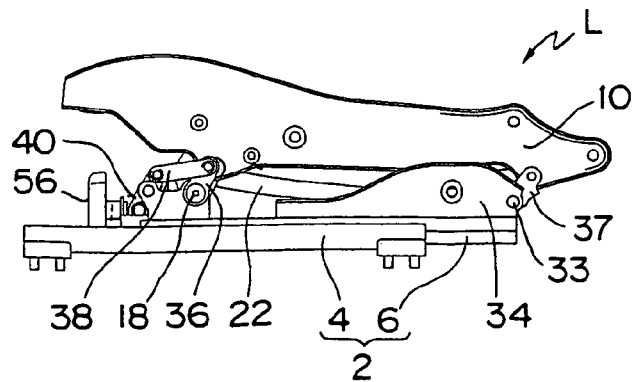
FIG. 6 is a side view of the lifter structure of FIG. 5.
Figure 7:
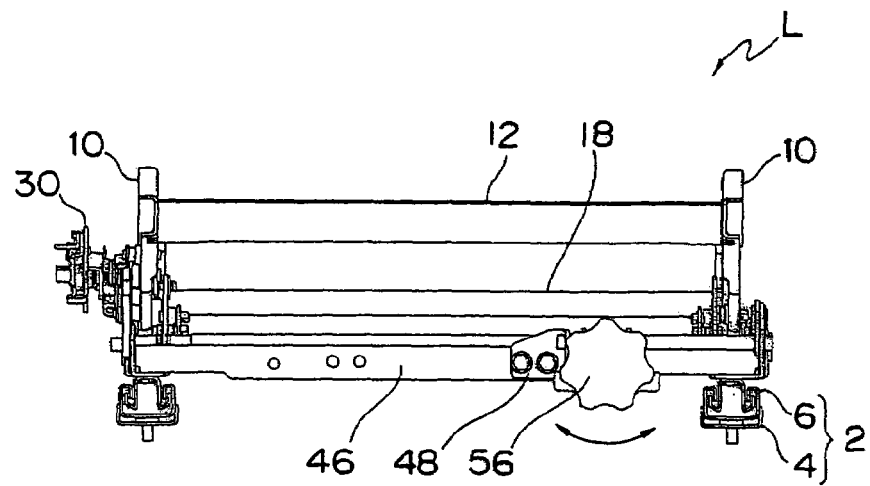
FIG. 7 is a front view of the lifter structure of FIG. 5.
Figure 8:
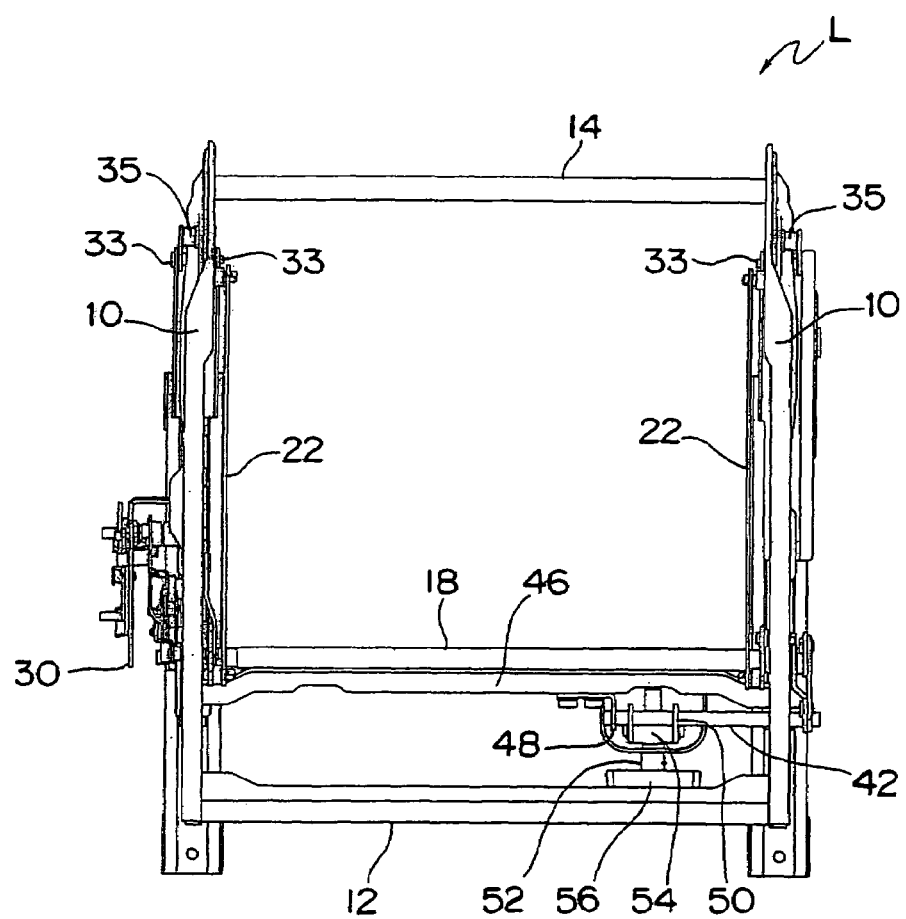
FIG. 8 is a top plan view of the lifter structure of FIG. 5.

Furthermore, as shown in, for example, FIG. 1, the frame structure F according to the present invention is provided with no component parts in a space encircled by the rear frame 14, the second medial frame 62, and the pair of side frames 10. Because this space is positioned below the buttocks of the seat occupant, if an impact force is inputted due to, for example, a collision of the vehicle, the buttocks of the seat occupant sink in this space, making it possible to reduce his or her rebound.

The present invention of the above-described construction offers the following effects.

According to the present invention, because a lifter is integrally formed with a suspension unit, a compact frame structure can be provided that can be used for an automobile intelligent seat.

Furthermore, because height adjustments of a front end portion of a frame and those of a rear end portion of the frame are carried out via a first link mechanism and a second link mechanism, respectively, by operating an operating means, the construction of the lifter in which the suspension unit has been incorporated can be simplified, making it possible to provide a compact frame structure that can be installed in a low hip-point car such as, for example, a passenger car.

In addition, because the suspension unit is comprised of a magnet unit including a movable magnet and stationary magnets or a magnetic fluid damper, a compact frame structure for an automobile seat can be provided in which the vibration characteristics less than 10Hz are improved and which can pursue safety and comfort as a whole using Chaos characteristic analysis or the like.

The invention claimed is:

1. A frame structure for an automobile seat, comprising: a frame to be vertically movably mounted on a vehicle floor; a lifter for adjusting a height of the frame; and a suspension unit for absorbing vibration inputted to the frame; wherein the lifter is integrally formed with the suspension unit and comprises a torsion bar to be rotatably mounted on the vehicle floor, the torsion bar having first and second ends opposite to each other; wherein said lifter further comprises a first link mechanism, a second link mechanism, and a third link mechanism through which the torsion bar is connected to the frame, a first operating mechanism connected to the first link mechanism, and a second operating mechanism connected to the third link mechanism, wherein height adjustments of a front end portion of the frame are carried out via the first link mechanism and height adjustments of a rear end portion of the frame are carried out via a second link mechanism by operating the first operating mechanism to twist the first end of the torsion bar, and wherein weight adjustments are carried out via a third link mechanism by operating the second operating mechanism to twist the second end of the torsion bar.

2. The frame structure for the automobile seat according to claim 1 wherein the suspension unit comprises a magnet unit having a movable magnet and stationary magnets.

3. The frame structure for the automobile seat according to claim 1, wherein the suspension unit comprises a magnetic fluid damper.

4. A frame structure for an automobile seat, comprising:
a frame to be vertically movably mounted on a vehicle floor;
a lifter for adjusting a height of said frame; and
a suspension unit for absorbing vibration inputted to said frame;
wherein said lifter is integrally formed with said suspension unit;
wherein said lifter comprises a torsion bar, a first user-operable adjuster mechanism operably coupled to said torsion bar such that operation of said first user-operable adjuster mechanism causes twisting of said torsion bar, and a second user-operable adjuster mechanism operably coupled to said torsion bar such that operation of said second user-operable adjuster mechanism causes twisting of said torsion bar;
wherein said torsion bar is operably coupled with said frame to apply a lifting force to said frame, and such that twisting of said torsion bar causes change in a lifting force applied to said frame by said torsion bar;
wherein said first and second user-operable adjuster mechanisms are independently operable; and
wherein said first and second user-operable adjuster mechanisms are operably coupled to said torsion bar so that operation of said first user-operable adjuster mechanism and operation of said second user-operable independently cause twisting of said torsion bar.

5. The frame structure for the automobile seat according to claim 4, wherein said lifter comprises a lifter operating mechanism, a first link mechanism connected between said lifter operating mechanism and a front end portion of said frame so as to adjust a height of said front end portion of said frame upon operation of said lifter operating mechanism, and a second link mechanism connected between said lifter operating mechanism and a rear end portion of said frame so as to adjust a height of said rear end portion of said frame upon operation of said lifter operating mechanism.

6. The frame structure for the automobile seat according to claim 5, wherein said second link mechanism is connected between said lifter operating mechanism and said rear end portion of said frame via said first link mechanism.

7. The frame structure for the automobile seat according to claim 4, wherein the suspension unit comprises a magnet unit having a movable magnet and stationary magnets.

8. The frame structure for the automobile seat according to claim 4, wherein the suspension unit comprises a magnetic fluid damper.

9. The frame structure for the automobile seat according to claim 4, wherein
said torsion bar has first and second opposite end portions;
said first user-operable mechanism is operably coupled to said torsion bar so as to cause twisting at said first end portion of said torsion bar; and
said second user-operable mechanism is operably coupled to said torsion bar so as to cause twisting at said second end portion of said torsion bar.

* * * * *